F. Bates,
Saw-Set,
No. 78,357 — Patented May 26, 1868.
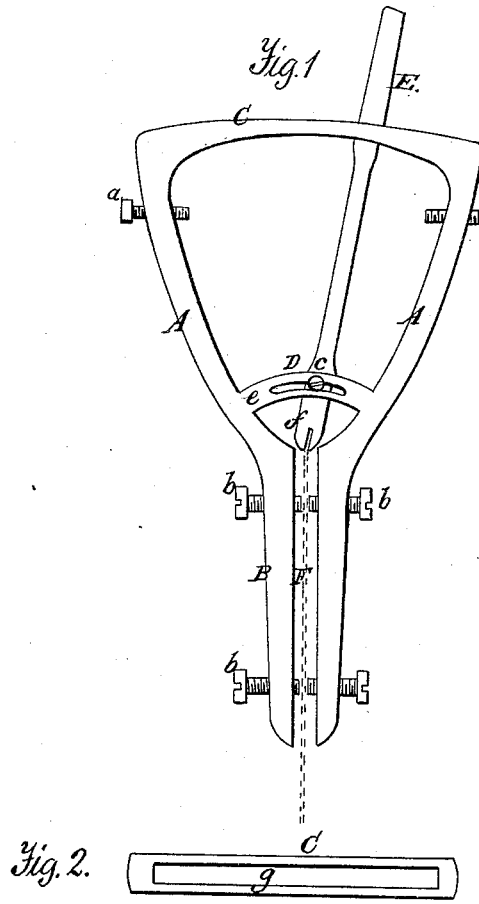
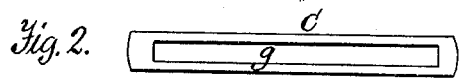
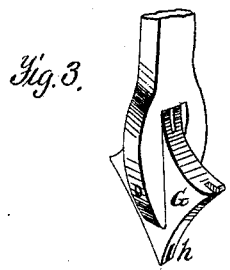
Witnesses.
P. P. Dodge.
E. P. H. Capron.
Inventor:
F. Bates
by Dodge & Munn
his Attys.

United States Patent Office.

FRANCIS BATES, OF NILES, MICHIGAN.

Letters Patent No. 78,357, dated May 26, 1868.

IMPROVEMENT IN SAW-SETS.

The Schedule referred to in these Letters Patent and making part of the same.

TO ALL WHOM IT MAY CONCERN:

Be it known that I, FRANCIS BATES, of Niles, in the county of Berrien, and State of Michigan, have invented certain new and useful Improvements in Devices for Setting Saws; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to devices for setting the teeth of saws, and consists in the construction of a novel instrument for setting each tooth in turn, instead of each alternate tooth, as is done by most saw-setting devices.

In the drawings—

Figure 1 is a plan view.

Figure 2 is a sectional view of a part detached.

Figure 3 is a perspective view of a modification of the end of the lever for catching and setting the teeth.

I construct a strong open metallic frame, A, having its lower end terminate in rigid jaws, B, parallel with each other, and sufficiently far apart to allow the plate of a saw, F, of any ordinary thickness, to pass readily between them, as shown in fig. 1. From the point where the upper ends of the jaws B terminate, the sides of the frame A swell out, and have their upper ends connected by a cross-bar, C, as shown in fig. 1. Near the lower ends of these sides, and above the point where the jaws B commence, I place another cross-bar, D, as shown in the same figure. In the cross-bar C, I make a slot, $g$, as shown in fig. 2, nearly through its entire length. The cross-bar D, I make slotted in a similar manner, and in that part of the bar D on the front side of the slot, I make another slot, $e$, opening into it, as clearly shown in fig. 1. Through the slots in the cross-bars C and D, which are in the same plane, I insert a lever, E, arranged so as to move easily in them, and to be held at any desired height by a screw, $c$, passing into it through the slot $e$, so, however, as not to interfere with the lateral movement of the lever. The lower end of the lever E, I provide with a slot or bite, $f$, as shown in fig. 1, of a suitable size to fit upon the teeth of the saw, F. The upper end of the frame A, I provide with two set-screws, $a$, one on each side of the frame. These screws $a$ are adjustable, for the purpose of limiting the lateral movement of the lever E. The jaws B, I provide with four set-screws, $b$, putting two in each jaw, as shown in fig. 1.

In operating my saw-set, I fasten the plate of the saw between clamps, if necessary, to hold it in position, and then adjust the screws $b$ so as to allow the set to be moved along the plate easily, and yet hug it close enough to prevent its having any lateral movement. Having determined the exact set to be given to the teeth, I set the screws $a$ in the side of the frame A, so as to limit the lateral movement of the lever E, and arrange the lever E so that the slot $f$ will fairly catch upon the teeth of the saw. The slot $f$ catches upon one tooth when the lever E is moved over to one side of the frame, and sets the tooth. It is then released, and the frame is moved along far enough to allow the slot $f$ to catch upon the next tooth when the lever is moved in the opposite direction, and thus the process is continued until all the teeth are set. The angle given to the teeth is determined by the extent of the lateral movement of the lever E.

In order that my device may be used to set saws of different thicknesses, I construct the lever E with a head, G, pivoted to it, so that it may revolve. This head is made with four or more angular points, $h$, and each point is provided with a different-sized slot, so as to accommodate the teeth of saws of different thicknesses, as desired. This lever may be readily substituted for the lever E by pivoting the head G after the handle of the lever is inserted in the slots in the cross-pieces.

The entire device, excepting the set-screws and lever, may be made out of a single piece of metal by casting, and when made in this way, which is the one most preferred, it is at once strong and durable.

In this way I am able to make a very cheap, strong, and durable, as well as labor-saving device, for setting saws rapidly and accurately.

Having thus described my invention, what I claim is—

A saw-set, consisting of the frame A, provided with the jaws B and set-screws $b$, for holding the saw, and having the lever E arranged to operate therein, substantially as shown and described.

FRANCIS BATES.

Witnesses:
CHOLWELL KNOX,
W. K. LACEY.